United States Patent [19]

Stratton

[11] Patent Number: 5,044,042
[45] Date of Patent: Sep. 3, 1991

[54] WINDSHIELD WIPER BLADE WITH DUAL WIPING EDGES

[75] Inventor: Donald W. Stratton, Schererville, Ind.

[73] Assignee: The Anderson Company, Michigan City, Ind.

[21] Appl. No.: 428,141

[22] Filed: Oct. 27, 1989

[51] Int. Cl.$^5$ .............................. B60S 1/38; B60S 1/28
[52] U.S. Cl. .............................. 15/250.41; 15/250.36
[58] Field of Search ........... 15/250.41, 250.36, 250.32, 15/250.42, 250.40, 250.37, 250.38, 250.39

[56] References Cited

U.S. PATENT DOCUMENTS

| D. 298,116 | 10/1988 | Sussich | D12/155 |
|---|---|---|---|
| 1,771,824 | 7/1930 | Storrie . | |
| 1,816,370 | 7/1931 | Hachenberg . | |
| 1,989,296 | 1/1935 | Smulski | 15/245 |
| 3,056,991 | 10/1962 | Smithers | 15/250.41 |
| 3,224,027 | 12/1965 | Oishei et al. | 15/250.41 |
| 4,317,251 | 3/1982 | Priesmuth | 15/250.41 |
| 4,700,425 | 10/1987 | Rusnak | 15/250.41 |
| 4,723,336 | 2/1988 | Nakayama | 15/250.41 |

FOREIGN PATENT DOCUMENTS

| 0232598 | 8/1987 | European Pat. Off. | 15/250.41 |
|---|---|---|---|
| 1261416 | 2/1968 | Fed. Rep. of Germany | 15/250.41 |
| 1271508 | 8/1961 | France | 15/250.41 |
| 1316781 | 5/1973 | United Kingdom | 15/250.41 |

Primary Examiner—Edward L. Roberts
Assistant Examiner—Gary K. Graham
Attorney, Agent, or Firm—MacMillan, Sobanski & Todd

[57] ABSTRACT

An improved windshield wiper blade of the type having two rubber elements forming parallel wiping edges. The elements are mounted in a rigid flexor which extends the length of the blade. Each element includes a hinge which permits the portion of the element including the wiping edge to flip over when the wiping direction is reversed. Each element further includes bumpers above and below the hinge only on the side mounted to face the other element. As the wiper blade is moved, the bumpers on only the leading element abut to establish the angle of the leading wiping edge relative to the windshield. The exposed side of each element is smooth and the bumpers are enclosed to prevent buildup of ice, snow or mud on the wiper blade.

5 Claims, 3 Drawing Sheets

WINDSHIELD WIPER BLADE WITH DUAL WIPING EDGES

TECHNICAL FIELD

The invention relates to cleaning elements and more particularly to an improved vehicle windshield wiper blade having two spaced apart surface engaging wiping edges.

BACKGROUND ART

For achieving a proper cleaning action, a conventional windshield wiper blade includes a rubber element forming a single wiping edge with a cross section defining a hinge extending the length of the element. The hinge is spaced from and extends parallel to the wiping edge. The hinge allows the wiping edge of the element to flip over so that the leading edge of the element tilts to a predetermined angle relative to the glass each time the wiping direction is reversed. The hinge is typically in the form of a reduced thickness section extending the length of the element with spaced apart thicker sections on each side of the element above and below the hinge. Further, the blade typically includes a flexor which strengthens the rubber element above the hinge. The flexor is attached through a superstructure to an arm. The reduced thickness section allows pivotal movement of the wiping edge relative to the more rigidly supported upper portion of the element. As the wiper blade is moved over the windshield, the thicker sections of the rubber element above and below the hinge on the trailing side of the element bump or abut to limit movement of the hinge and thereby establish the optimum wiping angle of the leading edge of the element relative to the glass.

Under adverse conditions, the exposed hinge can become impacted with ice, snow or mud. When the hinge becomes impacted, the edge of the element ceases to flip over to the proper angle relative to the glass when the blade reverses directions. The resulting improper angle between the wiping edge and the glass can result in streaking and/or chatter.

It is known in the windshield wiper art that forming a wiper blade with dual wiping surfaces can have certain advantages For example, U.S. Pat. No. 3,224,027 teaches that wind lift problems can sometimes be solved with a dual wiping edge blade. At high vehicle speeds, wind flowing over the windshield tends to lift the blade from the windshield, thereby preventing effective wiping. If the pressure exerted by a wiper arm on the blade is increased, the wind lift problem can be cured. However, the increased pressure can result in chattering, and depositing of rubber on the windshield which shortens blade life and obscures vision. By adding a second wiping edge to the blade, the contact surface between the blade and the windshield is doubled. Consequently, the overall force exerted on the blade can be increased up to double without increasing the force exerted per unit length of the wiping edge.

DISCLOSURE OF INVENTION

According to the invention, a wiper blade is provided with two rubber elements forming two spaced apart wiping edges. Each wiping element has a hinge with bumpers extending above and below the hinge along the length of one side and has a generally flat, smooth opposite side. The wiping elements are attached to a flexor which extends the length of the blade. The elements are arranged with the bumpers on the two elements facing inwardly towards one another. Only the smooth sides of the wiping elements are exposed to ice, snow and mud. As a consequence, the bumpers are protected from impaction with ice, snow and mud which can adversely affect their operation. During wiper blade motion, the forward or leading wiping element attains the proper wiping attitude to the windshield due to contact by the hinge bumpers and does the majority of the wiping. The second or trailing wiping element, having no bumpers on its outer or trailing surface, acts as a follower and does not necessarily perform a significant wiping function since it exerts less force against the glass. When the direction of the wiper blade is reversed, the function of the two wiping elements likewise is reversed.

Accordingly, it is an object of the invention to provide an improved windshield wiper blade which is less susceptible to being impacted with ice, snow and mud than prior art windshield wiper blades.

Other objects and advantages of the invention will be apparent from the following detailed description and the attached drawings.

BEST MODE FOR CARRYING OUT THE INVENTION

Figure 1:
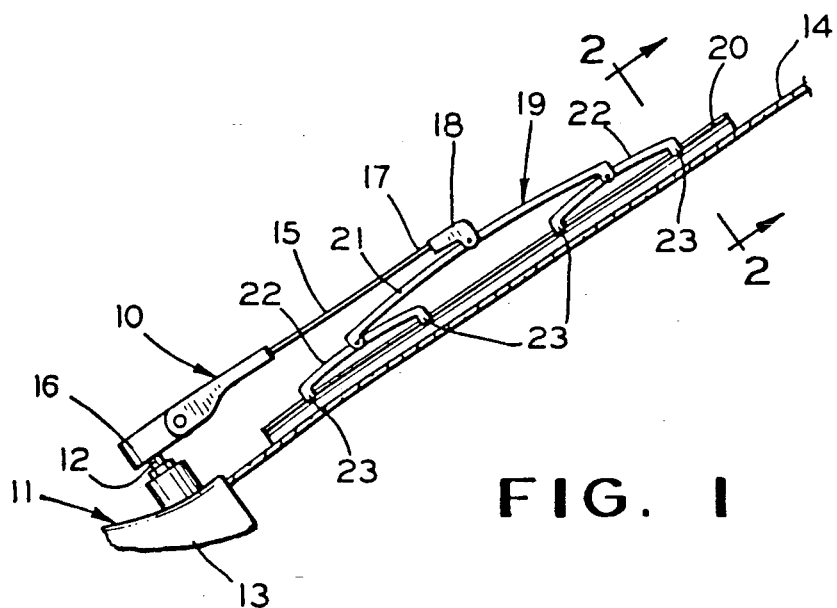
FIG. 1 is a side elevational view, in partial section, of a vehicle windshield and windshield wiper assembly including a wiper blade according to the invention.

Referring to FIG. 1 of the drawings, a side elevational view is shown of a windshield wiper assembly 10 along with a fragmentary portion of a vehicle 11. A drive shaft 12 is shown projecting from a body portion 13 below and adjacent a windshield 14. A wiper arm 15 has an end 16 attached to the shaft 12 and has an opposite end 17 terminating at a connector 18. A superstructure 19 is pivotally attached to the connector 18 for mounting a wiper blade 20. The superstructure 19 can vary in design and is illustrated as including a bridge member 21 connected at opposite ends to two links 22. Each link 22 has two ends terminating at claws 23 which engage the wiper blade 20. A spring (not shown) within the wiper arm 15 presses the wiper blade 20 against the vehicle windshield 14. The claws 23 are spaced to distribute the force from the arm 15 along the length of the wiper blade 20 to maintain a uniform contact between the blade 20 and the windshield 14 along the length of the blade 20.

Figure 2:
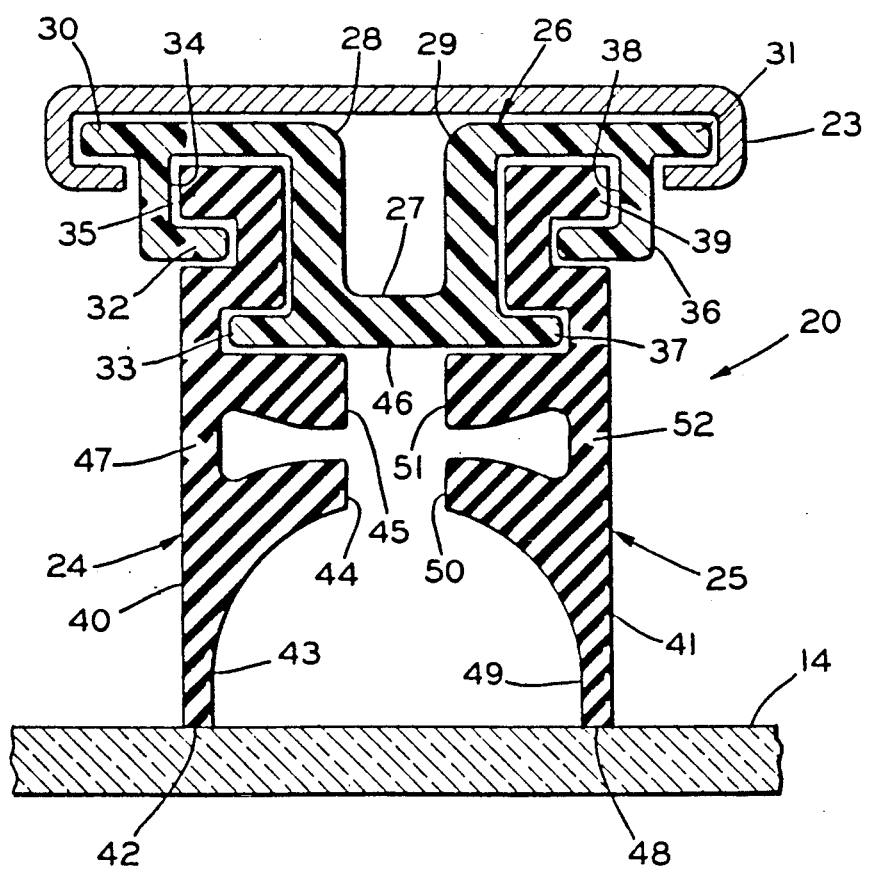
FIG. 2 is a cross sectional view through a wiper blade according to one embodiment of the invention, as taken along line 2—2 of FIG. 1.

A cross section through one embodiment of the wiper blade 20 according to the invention is shown in FIG. 2.

The blade 20 consists of two rubber wiping elements 24 and 25 mounted in a flexible backing strip or flexor 26. The backing strip 26 is formed from plastic and is semi-rigid. The superstructure claws 23 engage the backing strip 26 which in turn distributes the force from the arm to the elements 24 and 25. The backing strip 26 is sufficiently flexible to allow the wiper blade 20 to bend to follow the curvature of the windshield 14.

The backing strip 26 preferably is formed by extrusion and has substantially the same cross section throughout its length. As shown in FIG. 2, the backing strip 26 has a U-shaped central portion 27 with upper sides 28 and 29 extending outwardly to ribs 30 and 31, respectively. The superstructure claws 23 engage the ribs 30 and 31. A flange 32 extends downwardly and inwardly from the rib 30 and a rib 33 projects outwardly form the bottom of the central portion 27. The flange 32, the rib 33 and the central portion 27 define an open channel 34 extending the length of the wiper blade 20 for receiving and retaining an S-shaped portion 35 extending the length of the element 24. Similarly, a flange 36 extends downwardly and inwardly from the rib 31 and a rib 37 projects outwardly from the bottom of the central portion 27 for forming an open channel 38. An S-shaped portion 39 on the wiper element 25 is received and retained in the channel 38.

The elements 24 and 25 have smooth outer surfaces 40 and 41, respectively, which are substantially flat and extend substantially parallel when the elements 24 and 25 are not deflected against the windshield 14 or another object. The surface 40 terminates at a flat wiping edge 42. From the edge 42, the element 24 has an inner surface 43 which curves to form a bumper 44. The element 24 has a second bumper 45 which abuts a flat bottom 46 on the backing strip 26. A thin hinge 47 is integrally formed in the element 24 between the bumpers 44 and 45. The element 25 is of a similar construction and has a wiping edge 48, a curved inner surface 49, two bumpers 50 and 51, and a hinge 52 integrally formed between the bumpers 50 and 51.

Figure 3:
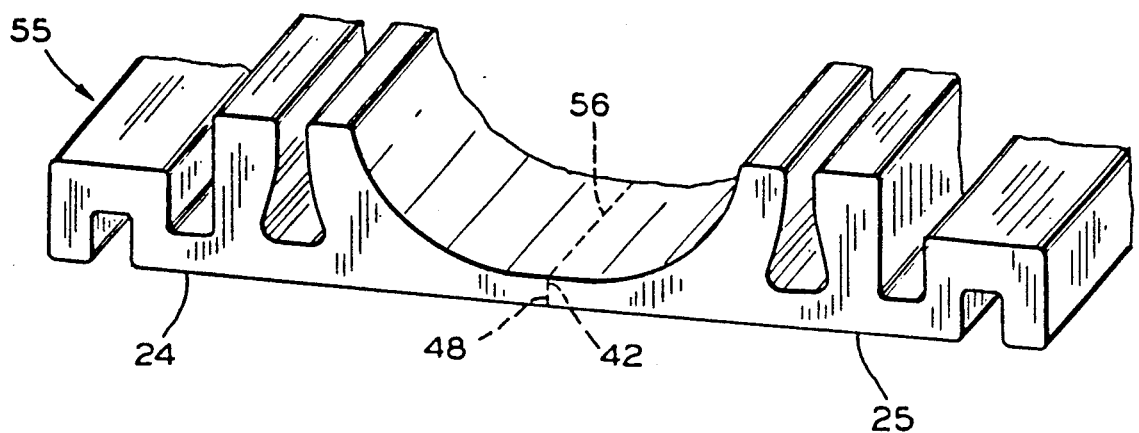
FIG. 3 is a fragmentary perspective view of the end of a rubber extrusion used to form the two wiping elements for the wiper blade in FIG. 2.

A preferred method for forming the two identical wiping elements 24 and 25 is illustrated in FIG. 3. As shown, the elements 24 and 25 are initially formed together as a single elongated extrusion 55. After curing, the extrusion 55 is cut to the desired length for the elements 24 and 25 and is cut along the dashed line 56 to form the flat wiping edges 42 and 48. The elements 24 and 25 are then inserted into the backing strip channels 34 and 38, respectively. The elements 24 and 25 are retained in the backing strip 26 by any conventional method, for example, by deforming the backing strip 26 against the elements 24 and 25. It will be appreciated that the elements 24 and 25 also can be formed by molding instead of extrusion.

Figure 4:
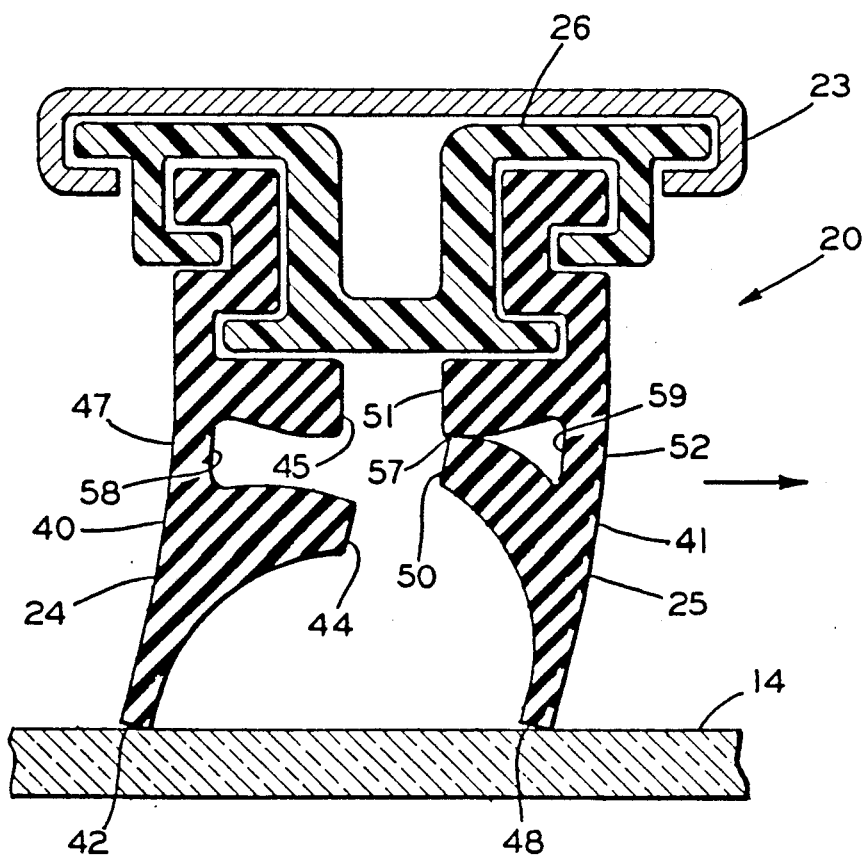
FIG. 4 is a cross sectional view, similar to the view in FIG. 2, but showing the flexing of the wiper elements as the blade moves to the right across the windshield.

FIG. 4 shows the wiper blade 20 as it is moved to the right across the windshield 14. In this direction of movement, the wiping element 25 is the leading element and the wiping element 24 is the trailing element. As the wiping edge 48 on the element 25 is pulled across the windshield 14, friction and the downward force on the element 25 causes the hinge 52 to pivot until the bumpers 50 and 51 abut or contact at a point 57. Once the bumpers 50 and 51 abut, the hinge 52 is prevented from further pivoting and the angle between the wiping edge 48 and the windshield 14 is established. The bumpers 50 and 51 are designed to establish the optimum wiping angle, as is known in the prior art. The leading wiping element 25 provides the primary wiping function for cleaning the windshield 14. As the trailing wiping element 24 is moved to the right across the windshield 14, the bumpers 44 and 45 separate. Since there are no bumpers on the smooth outer surface 40 of the element 24, there is no restriction on its wiping angle. However, the wiping angle for the element 24 will be close to the same angle as for the element 25 because the wiper arm 15 and the superstructure 19 restrain the backing strip 26 from rotating as the wiper blade 20 is moved across the windshield. Further, the spacing between the backing strip 26 and the windshield 14 is established by the leading wiping element 25 since the bumpers 50 and 51 limit movement of the hinge 52. Although the leading wiping element 25 serves the primary wiping function, the trailing element 24 also wipes across the windshield 14. The pressure exerted on the windshield 14 by the trailing element wiping edge 42 is only the force exerted on the edge 42 by the resilient hinge 47. The remaining majority of the wiper arm force is exerted on the leading element wiping edge 48. When the wiper blade 20 reaches the end of its stroke and the direction is reversed, the wiping edges 42 and 48 flip over until the bumpers 44 and 45 on the wiping element 24 abut and the element 24 becomes the leading element and the element 25 becomes the trailing element.

From viewing FIG. 4, it will be readily seen that the space 58 between the hinge 47 and the bumpers 44 and 45 on the wiping element 24 faces the wiping element 25 and that the space 59 between the hinge 52 and the bumpers 50 and 51 on the wiping element 25 faces the wiping element 24. Since the top of the wiper blade 20 is closed by the backing strip 26, the spaces 58 and 59 are protected from being impacted with snow, ice and/or mud during operation of the wiper blade 20. Since only the smooth outer surfaces 40 and 41 on the wiping elements 24 and 25 are exposed, the wiper blade 20 is less prone to being impacted with ice, snow and mud than prior art wiper blades.

Figure 5:
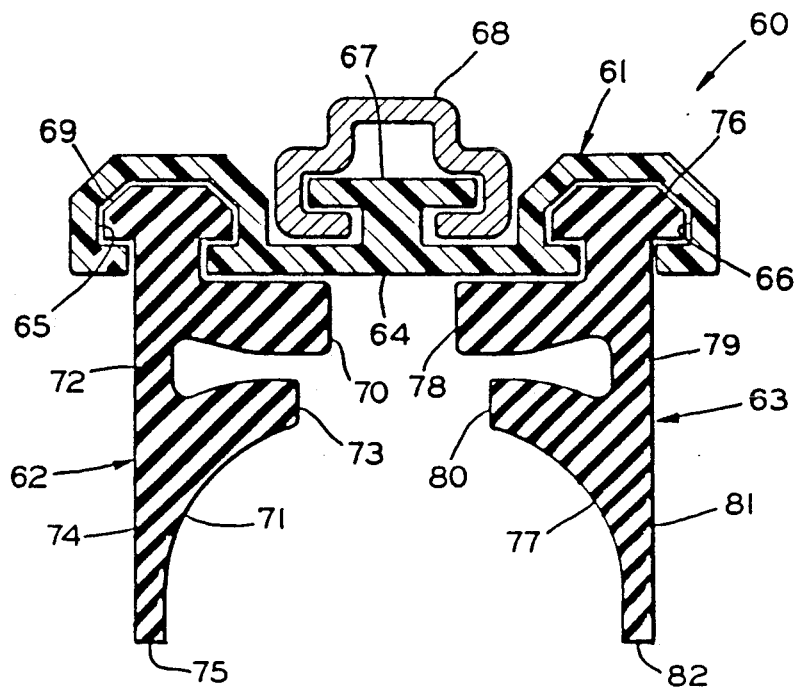
FIG. 5 is a cross sectional view, similar to the view of FIG. 2, of a modified embodiment of the windshield wiper blade of the invention.
Figure 6:
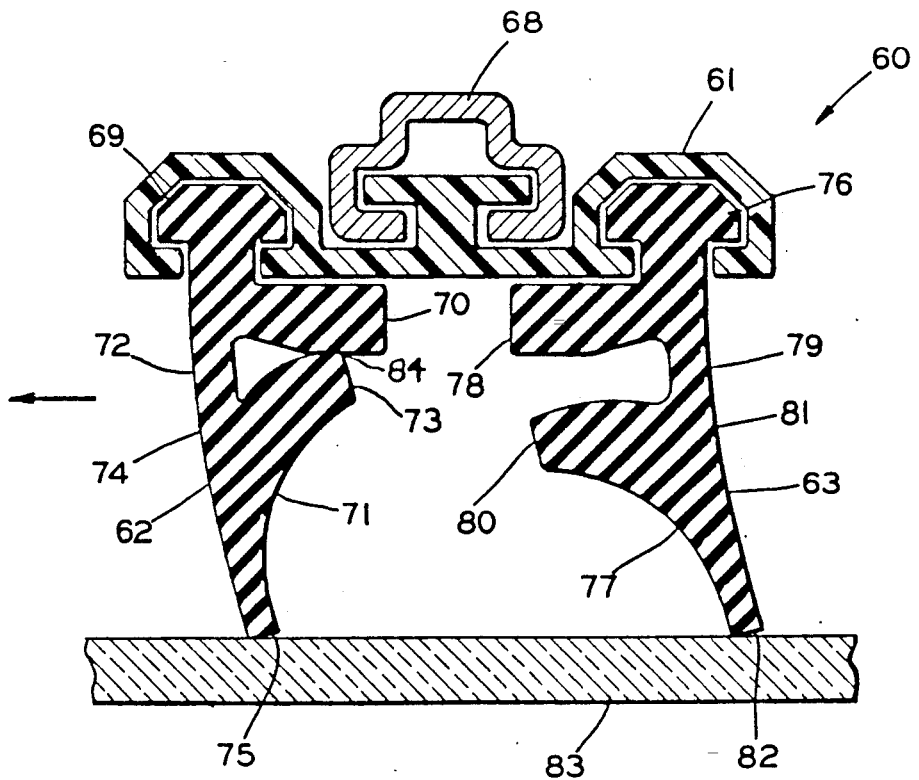
FIG. 6 is a cross sectional view, similar to the view of FIG. 5, but showing the flexing of the wiper elements as the blade moves to the left across the windshield.

FIGS. 5 and 6 show a wiper blade 60 according to a modified embodiment of the invention. The wiper blade 60 includes a flexible backing strip or flexor 61 mounting two wiping elements 62 and 63. The backing strip 61 is an extrusion having a central portion 64. On either side of the central portion, the backing strip 61 is shaped to form two channels 65 and 66. A T-shaped rib 67 projects above the center of the central portion 64. Claws 68 on a wiper superstructure (not shown) engage the rib 67 in a known manner.

The wiping element 62 may be extruded or molded and has a head 69 shaped to be received by and retained in the channel 65. A bumper 70 is located on an interior surface 71 on the element 62 below the head 69. The bumper 70 abuts the central portion 64 of the backing strip 61. A hinge 72 and a second bumper 73 are formed on the interior surface 71 below the bumper 70. The wiping element 62 has a smooth exterior surface 74. A flat wiping edge 75 is formed at a lower end of the element 62 to extend between the interior and exterior surfaces 71 and 74, respectively. As shown in FIG. 5, the bumpers 70 and 73 are normally spaced apart to permit pivotal movement about the hinge 72 when the wiping direction of the blade 60 is reversed.

The wiping element 63 is identical to and is oriented as the mirror image of the element 62. The element 63 includes an enlarged head 76 shaped to be received by and retained in the channel 66. On an interior surface 77, the element 63 has a first bumper 78, a hinge 79 and a second bumper 80. The element 63 further has a smooth exterior surface 81 and a flat wiping edge 82 connecting the interior and exterior surfaces 77 and 81, respectively.

FIG. 6 illustrates the bending of the wiping elements 62 and 63 as the wiper blade 60 is pressed against and moved to the left across a windshield 83. In this direction of motion, the wiping element 62 is the leading element and the wiping element 63 is the trailing element. The wiping edge 75 is pivoted at the hinge 72 until the bumpers 70 and 73 abut at a point 84. This limits pivotal movement at the hinge 72 and establishes the wiping angle for the edge 75. The wiping edge 82 of the element 63 is free to pivot about the hinge 79 without restriction since there are no bumpers on its smooth exterior surface 81. When the wiping direction reverses, the wiping edges 75 and 82 flip over until the bumpers 78 and 80 on the element 63 abut. At the same time, the bumpers 70 and 73 on the wiping element 62 separate.

The wiper blade 60 functions in a manner similar to the wiper blade 20. For both embodiments, the wiper blade has a generally inverted U-shaped cross section with a flexible backing strip across the top of the U and with longitudinally hinged wiping elements forming the sides of the U. The exposed outer surfaces of the wiping elements are smooth and free of ridges or grooves which could entrap ice, snow or mud. Each wiping element includes a wiping edge and a hinge spaced from and extending parallel to the wiping edge. The wiping element hinges are formed on surfaces on the interior of the U-shaped blade, thereby shielding the hinges and keeping them clear of ice, snow and mud.

It will be appreciated that the design of the wiper blade may be modified by those skilled in the art without departing from the spirit and the scope of the following claims. For example, the shape of the backing strip and the method for attaching the wiping elements to the backing strip can be readily modified. It also will be appreciated that the upper bumpers 45 and 51 for the wiping elements 24 and 25, respectively, can be eliminated and the lower bumpers 44 and 50 may be adapted to contact the backing strip 26 to limit pivotal movement of the leading wiping element. Similarly, the upper bumpers 70 and 78 can be eliminated from the wiping elements 62 and 63, respectively. It will also be appreciated that the backing strip or flexor may be made from plastic or metal and that the wiping elements may be made from various rubber and rubber like materials known in the art.

I claim:

1. A vehicle windshield wiper blade comprising:
    an elongated flexible backing strip,
    first and second elongated wiping elements, each wiping element having a wiping edge, an attachment edge spaced from said wiping edge, an exterior surface extending substantially from said wiping edge to said attachment edge and being substantially planar in an unstressed condition, an interior surface, and a pair of spaced apart bumpers formed along said interior surface parallel to said wiping edge and spaced between said wiping edge and said attachment edge for allowing said wiping edge to pivot relative to said attachment edge, said bumpers being engageable with one another to limit such pivoting movement for the leading one of said wiping elements when said wiper blade is moved across a windshield, and
    means for attaching said first and second wiping elements to said backing strip with said wiping edges parallel to one another, with said exterior surfaces facing outwardly, and with said interior surface on said wiping elements facing each other.

2. A vehicle windshield wiper blade, as set forth in claim 1, wherein said backing strip closes a top of said wiper blade.

3. A vehicle windshield wiper blade, as set forth in claim 1, wherein said attachment means comprises first and second shaped open channels formed in said backing strip to extend parallel to each other substantially the length of said backing strip and wherein said attachment edge on said first wiping element is received and retained by said first channel and said attachment edge on said second wiping element is received and retained by said second channel.

4. A vehicle windshield wiper blade, as set forth in claim 3, wherein said attachment edges of said wiping elements are substantially S-shaped.

5. A vehicle windshield wiper blade, as set forth in claim 3, wherein said attachment edges of said wiping elements have a predetermined shape projecting from said interior and exterior surfaces of said wiping elements, and wherein said channels are shaped complimentary to said predetermined shape for receiving and retaining said attachment edges.

* * * * *

UNITED STATES PATENT AND TRADEMARK OFFICE
CERTIFICATE OF CORRECTION

PATENT NO.  : 5,044,042
DATED       : September 3, 1991
INVENTOR(S) : Donald W. Stratton It is certified that error appears in the above-identified patent and that said Letters Patent is hereby corrected as shown below:

On the title page, item [73] Assignee: should be changed from "The Anderson Company" to read --The Anderson Company of Indiana--.

Signed and Sealed this

First Day of December, 1992

Attest:

DOUGLAS B. COMER

Attesting Officer

Acting Commissioner of Patents and Trademarks